US008890986B2

(12) United States Patent
Smith et al.

(10) Patent No.: US 8,890,986 B2
(45) Date of Patent: Nov. 18, 2014

(54) METHOD AND APPARATUS FOR CAPTURING HIGH DYNAMIC RANGE IMAGES USING MULTI-FRAME INTERLACED EXPOSURE IMAGES

(75) Inventors: Scott Smith, San Jose, CA (US); Dong Li, Cupertino, CA (US); Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 649 days.

(21) Appl. No.: 13/170,478

(22) Filed: Jun. 28, 2011

(65) Prior Publication Data

US 2012/0274822 A1 Nov. 1, 2012

Related U.S. Application Data

(60) Provisional application No. 61/479,495, filed on Apr. 27, 2011.

(51) Int. Cl.
*H04N 5/235* (2006.01)
*H04N 3/14* (2006.01)
*H04N 5/355* (2011.01)
*H04N 5/353* (2011.01)
*H04N 5/232* (2006.01)

(52) U.S. Cl.
CPC ......... *H04N 5/23254* (2013.01); *H04N 5/2353* (2013.01); *H04N 5/35554* (2013.01); *H04N 5/3535* (2013.01); *H04N 5/2355* (2013.01)

USPC ....................................... 348/297; 348/221.1

(58) Field of Classification Search
USPC ........... 348/297, 221.1, 362, 273; 396/63–70, 396/213–262
See application file for complete search history.

(56) References Cited

U.S. PATENT DOCUMENTS

| 2005/0045980 A1* | 3/2005 | Guidash ........................ 257/432 |
| 2009/0268055 A1* | 10/2009 | Hamilton et al. .......... 348/230.1 |
| 2010/0309333 A1 | 12/2010 | Smith |

* cited by examiner

*Primary Examiner* — Mekonnen Dagnew
(74) *Attorney, Agent, or Firm* — Kendall P. Woodruff (57) ABSTRACT

An imager includes an array of pixels arranged in rows and a control circuit for sequentially capturing first and second image frames from the array of pixels. The control circuit is configured to sequentially capture first and second pairs of adjacent rows of pixels during first and second exposure times, respectively, when capturing the first image frame. The control circuit is also configured to sequentially capture first and second pairs of adjacent rows of pixels during second and first exposure times, respectively, when capturing the second image frame. The first exposure times during the first and second frames are of similar duration; and the second exposure times during the first and second frames are of similar duration. The control circuit is configured to detect motion of an object upon combining the first and second image frames and, then, correct for the motion of the object.

20 Claims, 11 Drawing Sheets

METHOD AND APPARATUS FOR CAPTURING HIGH DYNAMIC RANGE IMAGES USING MULTI-FRAME INTERLACED EXPOSURE IMAGES

CROSS REFERENCE TO RELATED APPLICATIONS

This application claims priority of U.S. Provisional Patent Application Ser. No. 61/479,495, filed Apr. 27, 2011.

FIELD OF THE INVENTION

The present invention relates, in general, to image sensors, and more particularly, to reconstruction methods for capturing high dynamic range images using multi-frame interlaced exposure.

BACKGROUND OF THE INVENTION

Modern electronic devices such as cellular telephones, cameras, and computers often use digital image sensors, such as high dynamic range image sensors. Image sensors may sometimes be referred to herein as imagers. High dynamic range imagers are designed to capture scenes with light ranges that exceed the typical dynamic range of an individual linear pixel or an analog-to-digital converter. The dynamic range of a pixel can be defined as the ratio of minimum luminance or brightness in an image, which causes the pixel to saturate, to the brightness in an image, which achieves a signal-to-noise ratio (SNR) equal to one. The dynamic range of a scene can be expressed as the ratio of its highest illumination level to its lowest illumination level.

Examples of techniques for capturing high dynamic range images include combining multiple exposures of varying exposure times, utilizing partial reset level techniques, and providing pixels with logarithmic or other non-linear responses. With a multiple exposure technique, an image sensor takes a first long exposure and then takes a second short exposure. The two exposures are then combined into a high dynamic range image. Because the two exposures are taken at different times, however, the fast moving objects within a scene cannot be captured at the same spatial location. This leads to pronounced motion artifact in a reconstructed image. In addition, conventional digital image sensors require excessive amounts of storage, thereby increasing the cost of such sensors.

As will be explained, the present invention provides improved digital sensors and image reconstruction methods for creating high dynamic range images by using varying exposure times for capturing an image.

BRIEF DESCRIPTION OF THE FIGURES

The invention is best understood from the following detailed description when read in connection with the accompanying figures.

DETAILED DESCRIPTION OF THE INVENTION

As will be explained, high dynamic range (HDR) image capture may be performed using sequential multiple image captures with varying exposure times. Multi-frame capture HDR often suffers from motion artifacts in final reconstructed images, because each exposure is captured at a different instance in time. The present invention provides a multi-frame capture method that reduces motion artifacts in HDR reconstructed images. The invention employs alternating interlaced exposure fields for sequential multi-frame image capture, such that each frame captures long and short exposure times, within each frame. This invention reduces motion artifacts.

As an example, electronic devices may include one or more high dynamic range (HDR) image sensors that are designed to capture scenes with light ranges that exceed the typical dynamic range of a linear pixel or an analog-to-digital converter. With the present invention, a high dynamic range image sensor may be used to capture a scene with light ranges that exceed the dynamic range of any single pixel in the image sensor.

In one embodiment, a high dynamic range image sensor may include an array of pixels configured to capture two images of a scene at least partially simultaneously. As one example, the array may include a first set of pixels in odd numbered row pairs of an array (e.g., rows 0, 1; 4, 5; 8, 9; etc.) that can be used to capture a first image of a scene and a second set of pixels in even numbered row pairs of an array (e.g., rows 2, 3; 6, 7; 10, 11; etc.) that can be used to capture a second image of the scene. The even-numbered row pairs and the odd-numbered row pairs may sometimes be referred to herein as adjacent rows (e.g., rows 0 and 1 are adjacent to each other, rows 2 and 3 are adjacent to each other, etc.). The first set of adjacent rows may use a first integration time (i.e., a first exposure time) in capturing the first image. The second set of adjacent rows may use a second integration time (that may be shorter than the first integration time) in capturing the second image. The integration times of the two sets of rows may overlap somewhat. For example, there may be at least one time period in which both sets of rows are integrating light from the scene. By capturing two images of the scene using two different integration periods, the image sensor may be able to generate a high dynamic range image.

Figure 1:
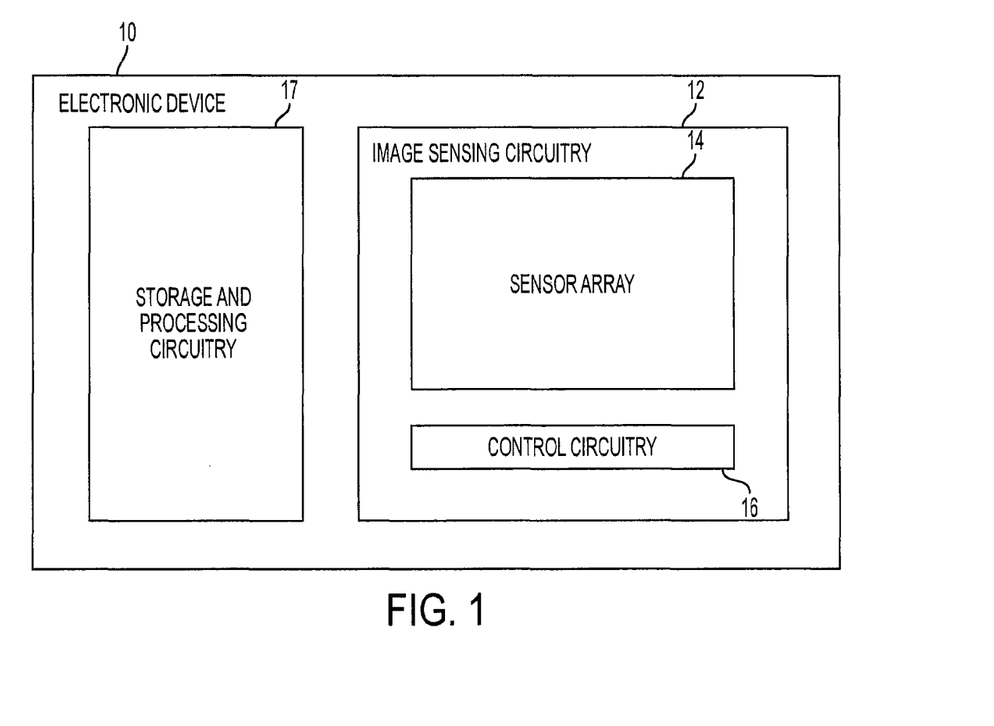
FIG. 1 is a schematic diagram of an illustrative electronic device that may include high dynamic range image sensing circuitry in accordance with an embodiment of the present invention.

An illustrative electronic device that may include high dynamic range image sensing circuitry is shown in FIG. 1. User device 10 may be any electronic device, such as a cellular telephone, a camera, a desktop computer, a laptop computer, a handheld gaming device, and a hybrid device that combines the functionality of multiple devices.

Device 10 may include image sensing circuitry 12. Image sensing circuitry 12 may include one or more integrated circuits and other components, as desired. For example, image sensing circuitry 12 may include an array of light sensitive pixels, such as sensor array 14. Each of the light sensitive pixels may convert incident light to an electrical signal. As one example, each of the pixels may be formed from a photodetector, such as a photodiode with a light sensitive region and may be configured to produce and store (e.g., accumulate) a charge proportional to the number of photons that impinge upon the light sensitive region. Image sensing circuitry 12 may also include control circuitry 16 that controls the operation of image sensing circuitry 12 and, in particular, that controls the operation of sensor array 14. As examples, control circuitry 16 may be used to reset light sensitive pixels in sensor array 14 (e.g., to remove accumulated image charges from the light sensitive pixels during a reset operation), to read out image data from the light sensitive pixel (e.g., to measure the accumulated charges of the pixels during a readout operation), to transfer accumulated charges to charge storage elements in the pixel array (e.g., to transfer the charge accumulated by each pixel into corresponding storage elements as part of a readout operation, or reset operation), etc. If desired, control circuitry 16 may include one or more analog-to-digital converters that can be used to convert analog signals from sensor array 14 into digital signals for processing.

Storage and processing circuitry 17 may be included in device 10. Storage and processing circuitry 17 may include one or more types of storage, such as hard disk drive storage, nonvolatile memory (e.g., flash memory or other electrically-programmable-read-only memory), volatile memory (e.g., battery-based static or dynamic random-access-memory), etc. Circuitry in storage and processing circuitry 17 may be used to control the operation of device 10 and image sensing circuitry 12. Processing circuitry 17 may be based on a processor such as a microprocessor and other integrated circuits. For example, storage and processing circuitry 17 may be used to run software on device 10, such as image processing applications, image display applications, operating system functions, power management functions, etc. Storage and processing circuitry 17 may be used to store image data such as high dynamic range images captured by sensor array 14 in image sensing circuitry 12. If desired, storage and processing circuitry 17 may be used to store image data during image processing operations.

Sensor array 14 may be formed from a plurality of pixels and may be organized using any architecture. As an example, the pixels of sensor array 14 may be organized in a series of rows and columns.

Figure 2:
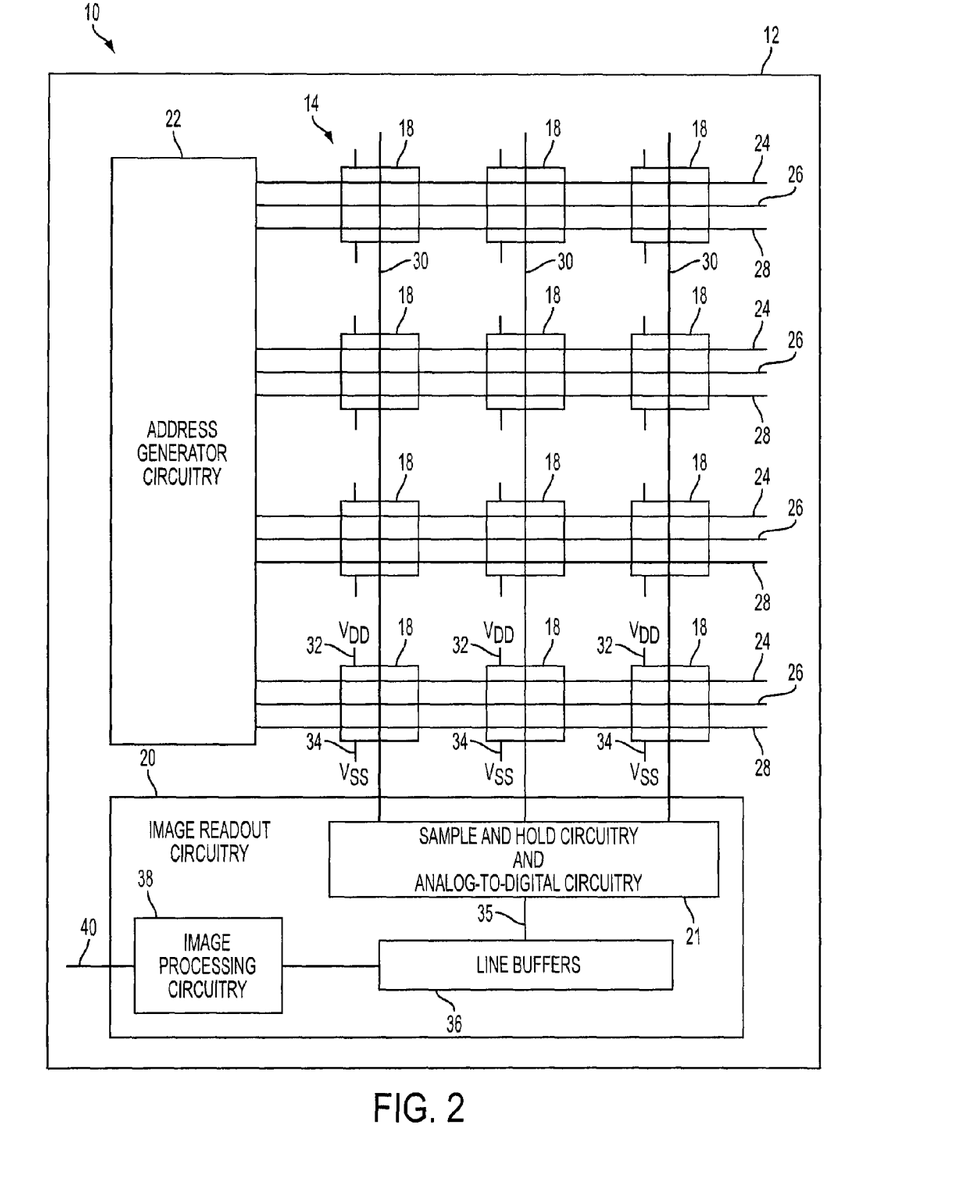
FIG. 2 is a schematic diagram of an illustrative array of pixels and control circuitry coupled to the array of pixels in accordance with an embodiment of the present invention.

An example of an arrangement for sensor array 14 is shown in FIG. 2. As shown, device 10 may include an array 14 of pixels 18 coupled to image readout circuitry 20 and address generator circuitry 22. As an example, each of the pixels 18 in a row of array 14 may be coupled to address generator circuitry 22 by one or more conductive lines such as lines 24, 26, and 28. Array 14 may have any number of rows and columns. In general, the size of array 14 and the number of rows and columns in array 14 will depend on the particular implementation.

As one example, lines 24 may be reset lines that can be used to couple pixels 18 in a particular row to a power supply terminal such as positive power supply terminals 32, or ground power supply terminals 34 for resetting pixels 18. In one example, accumulated charges on pixels 18 may be erased by connecting pixels 18 to a power supply terminal, such as terminal 32 and/or 34, and allowing accumulated charges to dissipate into power supply lines in circuitry 12. If desired, circuitry 12 may include a global reset line that resets all pixels 18 in array 14 simultaneously. With this type of arrangement, reset lines 24 may be connected together to form a single global reset line.

Control lines 26 may be used to control transfer transistors in pixels 18. For example, control lines 26 may be transfer lines that are used to transfer accumulated charges in pixel 18 from light sensitive devices (e.g., photodiodes or other light sensitive devices) to storage elements (e.g., floating diffusion nodes or other storage elements) in pixels 18. When array 14 implements an electronic rolling shutter readout, the accumulated charges of a particular row may be read out shortly after the accumulated charges are transferred to the storage elements of pixels 18 in that particular row. If desired, the accumulated charges may be read out, as the accumulated charges are transferred to the storage elements.

If desired, control lines 26 may be connected together to form one or more global transfer lines. With this type of arrangement, a global transfer line 26 may be used to implement a global shutter scheme in which the accumulated charges from a plurality of pixels 18 in different rows of array 14 are simultaneously transferred to the respective storage elements in each of pixels 18. The accumulated charges may then be read out from the storage elements at a later time.

With one arrangement, transfer lines 26 may be used in conjunction with reset lines 24 during a reset operation of pixels 18. As one example, transfer signals on transfer lines 26 and reset signals on reset lines 24 may both be asserted simultaneously during a reset operation (e.g., so that the reset operation discharges accumulated charges from the storage elements and the light sensitive devices in each of pixels 18).

Control lines 28 may, for example, be connected to readout transistors in pixels 18 of array 14. With this type of arrangement, row select signals, sometimes referred to herein as readout signals, may be asserted on control lines 28 to connect a row of pixels 18 to image readout circuitry 20. For example, when row select signals are asserted on a given control line 28, pixels 18 associated with the given control line 28 may be coupled to image readout circuitry 20 through column readout lines 30. When a row of pixels 18 is coupled to image readout circuitry 20, signals representative of the accumulated charge on pixels 18 may be conveyed over column readout lines 30 to circuitry 20 (e.g., analog-to-digital converters that convert the signals from the image sensing pixels 18 into digital signals).

Address generator circuitry 22 may generate signals on control paths 24, 26 and 28, as desired. For example, address generator circuitry 22 may generate reset signals on paths 24, transfer signals on paths 26, and row select (e.g., row readout) signals on paths 28 to control the operation of array 14. Address generator circuitry 22 may be formed from one or more integrated circuits. If desired, address generator circuitry 22 and array 14 may be integrated together in a single integrated circuit.

Image readout circuitry 20 may include circuitry 21, line buffers 36 and image processing circuitry 38. Circuitry 21 may include sample and hold circuitry and analog-to-digital converter circuitry. As one example, circuitry 21 may be used to measure the charges of pixels 18 from a row of array 14 and may be used to hold the charges while analog-to-digital converters in circuitry 21 convert the charges to digital signals. The digital signals may be representative of the accumulated charges from pixels 18. The digital signals produced by the analog-to-digital converters of circuitry 21 may be conveyed to line buffers 36 (e.g., short-term storage) over path 35.

Line buffers 36 may be used to temporarily store digital signals from circuitry 21 for use by image processing circuitry 38. In general, image readout circuitry 20 may include any number of line buffers 36. For example, each line buffer 36 may hold digital signals representative of the charges read from each of pixels 18 in a given row of array 14.

Image processing circuitry 38 may be used to process the digital signals held in line buffers 36 to produce output data on path 40. If desired, the output data may include image data encoded in any format that can be stored in storage and processing circuitry 17 and displayed by device 10, or transferred to another electronic device, or other external computing equipment.

Figure 3:
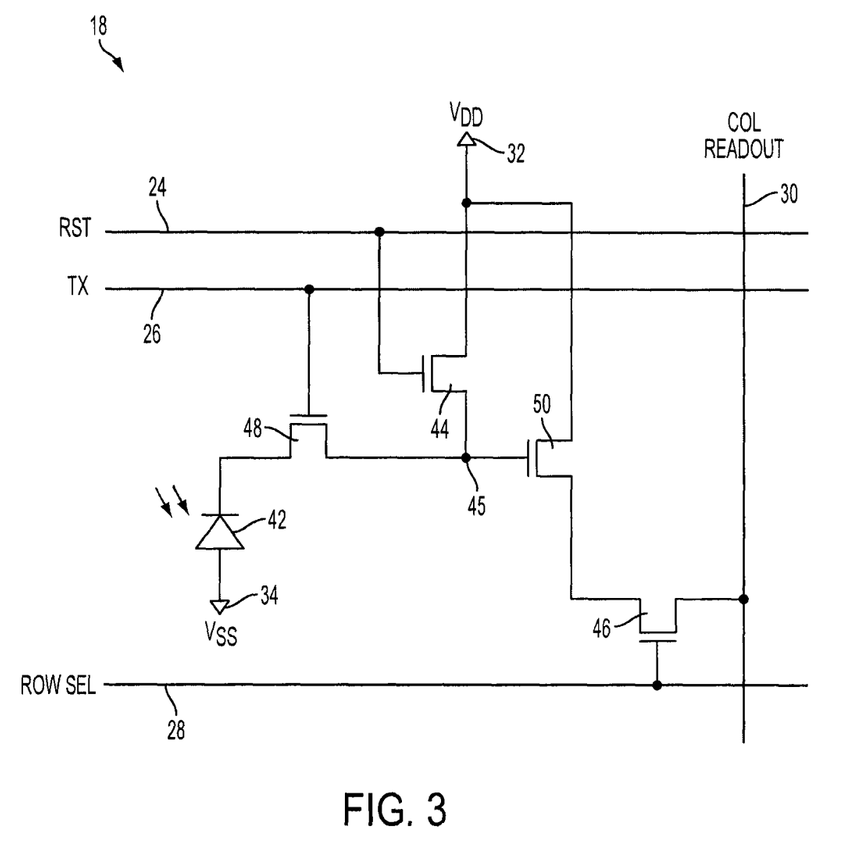
FIG. 3 is a schematic diagram of an illustrative light-sensitive pixel that may be a part of high dynamic range image sensing circuitry in accordance with an embodiment of the present invention.

An example of an image sensing pixel 18 that may be used in array 14 of FIG. 2 is shown in FIG. 3. As shown, pixel 18 may include transistors, such as transistors 44, 46, 48 and 50. Pixel 18 may include a photosensitive device, such as photodiode 42. In general, it is desirable to maximize the light collecting area of the photosensitive device 42 relative to the total area of each pixel 18.

The photosensitive device 42 in each pixel 18 of array 14 may accumulate charge in response to incident light. With one arrangement, the time between a reset operation (in which the accumulated charge is reset) and a transfer operation (in which the accumulated charge is shifted to a storage element, such as floating diffusion node 45) may be referred to herein as an integration time, or an exposure time. The accumulated charge generated by the photosensitive device 42 may be proportional to the intensity of the incident light and the integration time. In general, relatively long integration times may be used to capture scenes with relatively low intensities (e.g., to ensure that the accumulated charge is sufficient to overcome noise in array 14) and relatively short integration times may be used to capture scenes with relatively high intensities (e.g., to ensure that the accumulated charge does not reach a saturation point).

Reset transistor 44 may be controlled by reset line 24. When reset signals (RST) on reset line 24 are asserted, transistor 44 may be turned on and, thereby allow accumulated charge on diffusion node 45 to flow into a power supply line (e.g., through power supply terminal 32). In one embodiment, transfer signals (TX) on transfer line 26 may be asserted simultaneously with the reset signals (RST) such that the accumulated charges on both the photosensitive element 42 and the diffusion node 45 are reset.

Transfer transistor 48 may be controlled by transfer line 26. When transfer signals (TX) on transfer line 26 are asserted, transistor 48 may be turned on and, thereby, allow accumulated charge from photodiode 42 to flow to other transistors in pixel 18, or to a storage element such as floating diffusion node 45. For example, transistor 48 may be turned on during a reset operation to allow the accumulated charge from photodiode 42 to flow through node 45 and transistor 44 to power supply terminal 32. As another example, transistor 48 may be turned on prior to a readout operation to allow the accumulated charge from photodiode 42 to flow to diffusion node 45. If desired, transistor 48 may be turned on during a readout operation to allow the accumulated charge from photodiode 42 to flow to the gate of transistor 50 (and control the operation of transistor 50).

Buffer transistor 50 and readout transistor 46 may be used during a readout operation of pixel 18. Readout transistor 46 may be controlled by row select (ROW SEL) signals on read line 28 and buffer transistor 50 may be controlled by the accumulated charge generated by photodiode 42 (which may be stored in diffusion node 45). When row select signals on line 28 are asserted, transistor 46 may be turned on and the accumulated charge from photodiode 42 may be used to control transistor 50. The voltage that the accumulated charge applies to the gate of transistor 50 may then determine the voltage of column readout (COL READOUT) line 30. Image readout circuitry 20 of FIG. 2 may then determine the voltage of the accumulated charge by sampling the voltage of line 30. If desired, the image readout circuitry 20 may utilize a correlated double sampling technique in which the reset level of pixel 18 is also measured.

With one arrangement, array 14 of FIG. 2 may use alternating pairs of rows in an interlaced pattern to obtain image data that can be used to capture high dynamic range scenes. With one arrangement, an interleaved multiple exposure technique may be utilized to capture high dynamic range images. With this type of arrangement, multiple exposures are captured using an array 14 that has pixels 18 formed in an interleaved pattern such that each image sensing pixel 18 receives only one of the exposures. For example, half of pixels 18 in array 14 may be integrated (i.e., exposed) for time T1 and half of pixels 18 in array 14 may be integrated for time T2. With this type of arrangement, array 14 may be used to capture two images of a scene using two different exposures that overlap at least partially in time. While typically described herein as including two exposures, in general, array 14 may be used to capture any number of exposures (e.g., three exposures, four exposures, five exposures, etc.) at least partially simultaneously.

Figure 4:
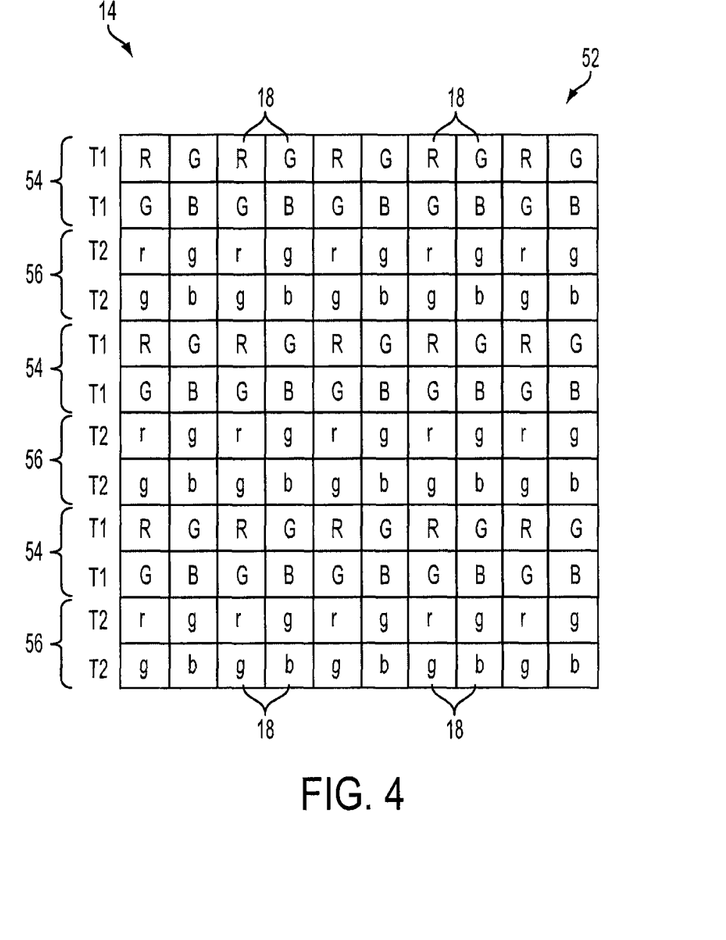
FIG. 4 is a diagram of an illustrative color filter array and an array of pixels that may include pairs of rows of pixels that alternate between a short and a long exposure time and that can be used to capture a high dynamic range image in accordance with an embodiment of the present invention.

An embodiment for capturing high dynamic range images is illustrated in FIG. 4. The figure shows an illustrative color filter array (CFA) 52 which uses the well known Bayer filter pattern for red, blue, and green pixels (e.g., 50% green, 25% red, and 25% blue). As an example, color filter array 52 may be overlaid on top of the image sensor array 14. In the arrangement of FIG. 4, one or more pixels 18 may be located under each of the squares of the color filter array 52. In addition, when capturing a high dynamic range image, row pairs 54 may be integrated (i.e., exposed) for time T1 while row pairs 56 may be integrated for time T2, when array 14 is used to capture an image of a high dynamic range scene. With this type of arrangement, pixels 18 in row pairs 54 may be able to capture portions of a scene with low brightness levels while pixels 18 in row pairs 56 may be able to capture portions of the scene that have high brightness levels. If desired, the pixels in row pairs 54 and row pairs 56 may be exposed for the same amount of time when capturing a scene with low dynamic range.

The portions of filter array 52 corresponding to red, blue, and green pixels are denoted with the letters "r", "b", and "g", respectively. The portions of filter array 52 corresponding to the longer integration time T1 are denoted with capitalized versions of these letters and the portions corresponding to the shorter integration time T2 are denoted with lowercase versions of these letters.

Figure 5:
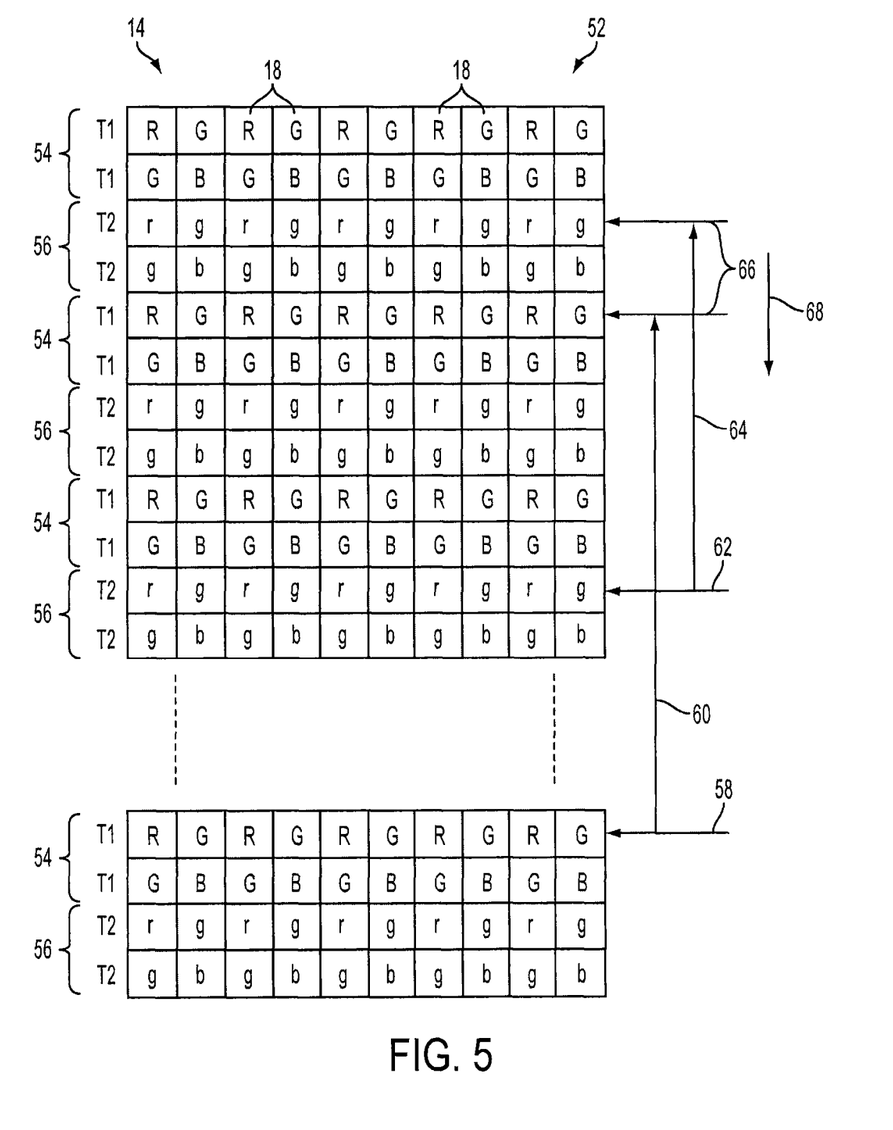
FIG. 5 is a diagram of the illustrative color filter array and the array of pixels of FIG. 4 showing how two separate reset pointers may be used to initiate the long and short exposure times when the array of pixels is being used to capture a high dynamic range image in accordance with an embodiment of the present invention.

A diagram showing how two reset pointers may be used to initiate the first and second exposures at different times in array 14 is shown in FIG. 5. The first exposure (T1) may be initiated by reset pointer 58 (e.g., signals on one of the lines 24 of FIG. 2) and the second exposure (T2) may be initiated by reset pointer 62. Following an integration time illustrated by line 60 for T1 and line 64 for T2, pixels 18 may be readout (e.g., read transistors 46 may be turned on by readout pointers 66). This type of arrangement may be used in implementing an electronic rolling shutter in which the pointers progress through array 14 along direction 68 (as an example).

Figure 6:
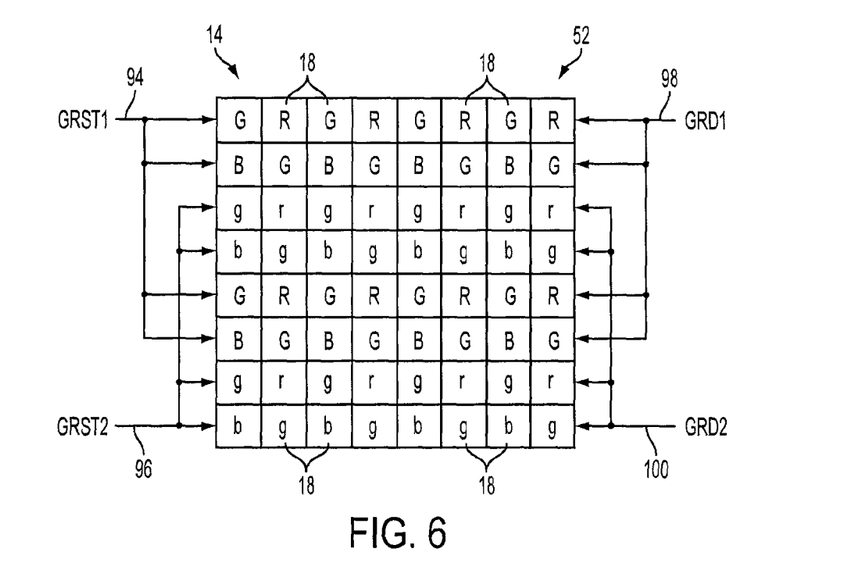
FIG. 6 is a diagram of illustrative line buffers and image processing circuitry that may be used in forming a high dynamic range image from image data received from an array of pixels such as the array of FIG. 4 in accordance with an embodiment of the present invention.

One potential way in which array 14 may implement a global shutter scheme is shown in FIG. 6. In the example of FIG. 6, a pair of global reset lines 94 and 96 and a pair of global transfer lines 98 and 100 may be used to control the operation of array 14. Global reset lines 94 and 96 may convey global reset signals such as GRST1 and GRST2 to array 14. Because there are two separate global reset lines 94 and 96, the arrangement of FIG. 6 allows two separate reset operations to occur. With one arrangement, the first reset operation may occur when GRST1 signals are asserted on line 94 and pixels 18 associated with a first exposure (T1) are reset. The second reset operation may occur when GRST2 signals are asserted on line 96 and pixels 18 associated with a second exposure (T2) are reset. The two reset operations may occur independently in time.

Global transfer lines 98 and 100 may convey global transfer signals such as GRD1 and GRD2 to array 14. Because there are two separate global transfer lines 98 and 100, the arrangement of FIG. 6 allows the occurrence of two separate transfer operations, in which accumulated charge in pixels 18 are transferred to storage elements in pixels 18 (e.g., diffusion nodes in pixels 18). With one arrangement, the first transfer operation may occur when GRD1 signals are asserted on line 98 and the accumulated charges of pixels 18 associated with the first exposure (T1) are transferred to storage elements in pixels 18. The second transfer operation may occur when GRD2 signals are asserted on line 100 and the accumulated charges of pixels 18 associated with the second exposure (T2) are transferred to storage elements in pixels 18. The two transfer operations may occur independently in time.

Figure 7:
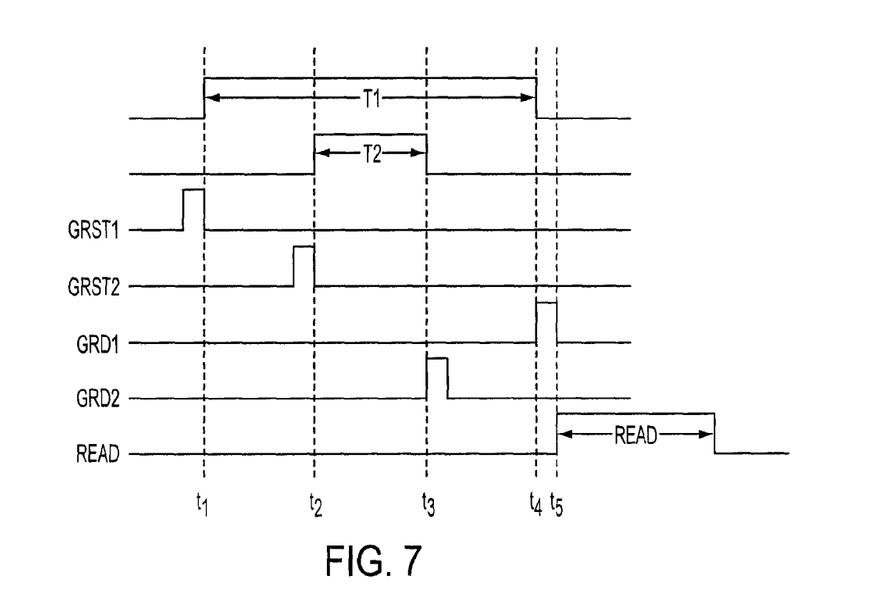
FIG. 7 is a timing diagram of an illustrative color filter array and an array of pixels that may include rows of pixels that alternate between a short and a long exposure time and that can be used to capture a high dynamic range image in accordance with an embodiment of the present invention.

Because there are two global reset lines and two global transfer lines, the arrangement of FIG. 6 allows a high degree of flexibility in selecting how the first and second exposures of array 14 (i.e., T1 and T2) overlap in time. For example, as shown in FIG. 7, pixels 18 of the first exposure T1 may be reset by GRST1 signals on line 94 at time t1 (which effectively initiates the T1 exposure at time t1), pixels 18 of the second exposure T2 may be reset by GRST2 signals on line 96 at time t2 (which effectively initiates the T2 exposure at time t2), transfer signals GRD2 may be asserted at time t3 (effectively ending the T2 exposure), transfer signals GRD1 may be asserted at time t4 (effectively ending the T1 exposure), and readout signals READ may begin to be asserted at time t5 to begin reading out image data from array 14. Because of the flexibility available in this arrangement, the second exposure may occur in the middle (time-wise) of the first exposure or may occur at any other time.

Figure 8:
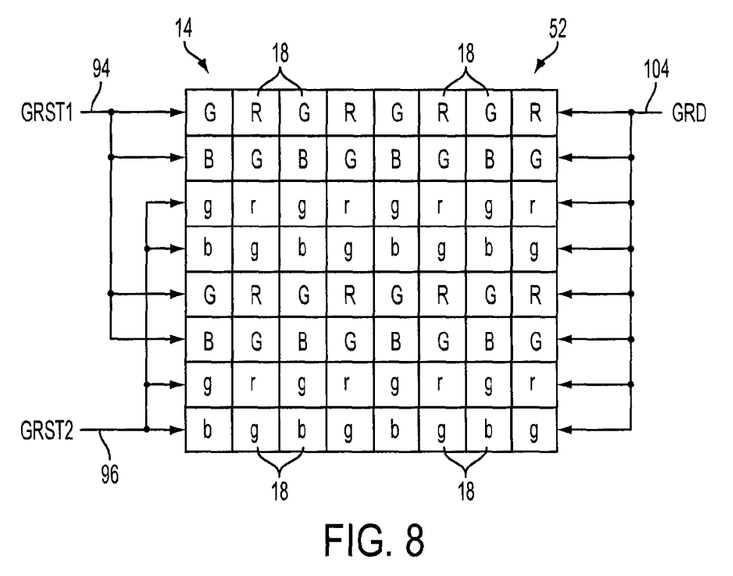
FIG. 8 is a diagram of the illustrative color filter array and the array of pixels of FIG. 4 that shows how a pair of global reset lines and a pair of global transfer lines may be used in implementing a global shutter readout of the array of pixels in accordance with an embodiment of the present invention.

FIG. 8 illustrates how a single global transfer line 104 may be used in conjunction with a pair of global reset lines 94 and 96 to implement a global shutter scheme in array 14. Global transfer line 104 may convey global transfer signals such as GRD to array 14. Because there is only a single global transfer line 104, the arrangement of FIG. 8 terminates the first and second exposures of pixels 18 (e.g., transfers the accumulated charges of the pixels performing the T1 exposure and the pixels performing the T2 exposure) simultaneously. The first and second exposures may be initiated independently by the global reset lines 94 and 96, respectively.

Figure 9:
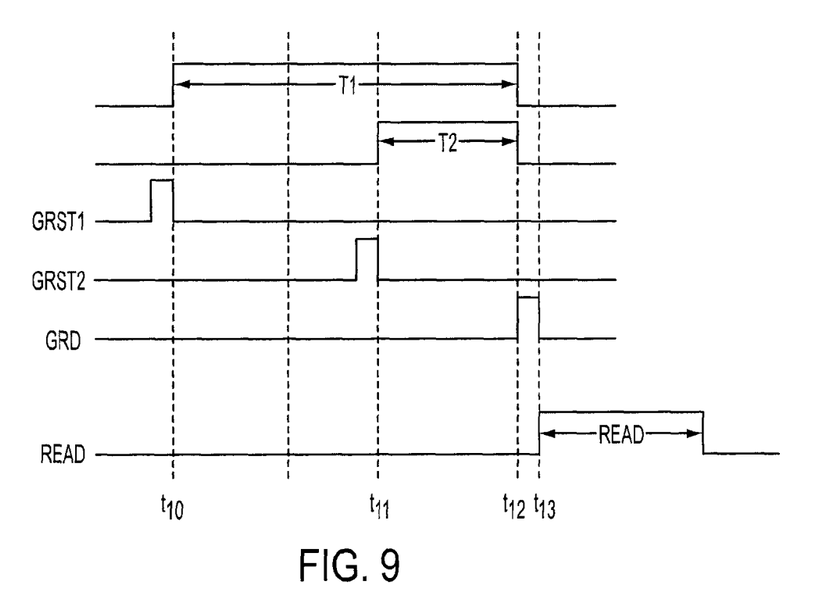
FIG. 9 is a timing diagram that illustrates how the pair of global reset lines and the pair of global transfer lines of FIG. 8 may be used to independently control two separate exposures in the array of pixels in accordance with an embodiment of the present invention.

As shown in FIG. 9, pixels 18 of the first exposure T1 may be reset by GRST1 signals at time t10, pixels 18 of the second exposure T2 may be reset by GRST2 signals at time t11, global transfer signal GRD may be asserted at time t12 (terminating the T1 and T2 exposures), and readout signals READ may be asserted at time t13 to begin reading out image data from array 14. Because there is only a single global transfer line, the first and second exposures may be timed to end simultaneously.

Once image sensor array 14 has been used to capture image data associated with a scene that has a high dynamic range (e.g., a range that exceeds a linear response of a single image sensing pixel such as pixel 18), the image data may be used to produce a high dynamic range image. The high dynamic range image may be stored in storage and processing circuitry 17 and, if desired, may be conveyed over a communications path to external computing equipment by communications circuitry in device 10. In one embodiment, image data produced by sensor array 14 may include two or more interlaced images interleaved together. As an example, the first image may include all of the even row pairs of sensor array 14 and may be captured using a first exposure (T1) and the second image may include all of the odd row pairs of array 14 and may be captured using a second exposure (T2).

Figure 10:
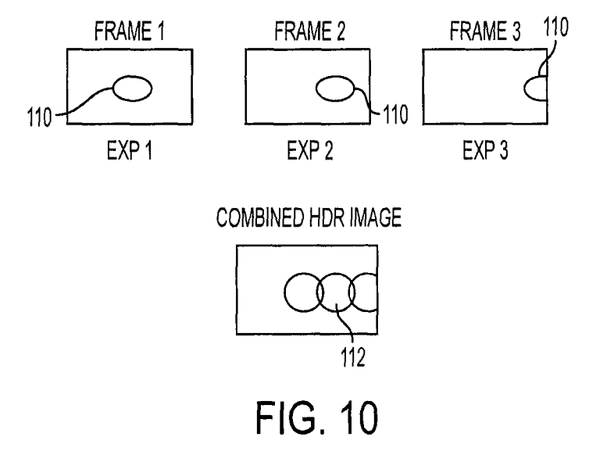
FIG. 10 is a diagram of three sequential frames showing motion of an object.

Having described examples of methods for high dynamic range image capture, these methods suffer from motion artifacts due to each exposure capture occurring at different times. In other words, objects that move in the scene are captured at different spatial locations in each image. FIG. 10 shows a typical scene of a moving object, designated as 110. Three frames are shown, in which object 110 is moving to the right. Three different exposures are shown in the figure. Upon combining the three images as an HDR image, object 112, now composed from three separate frames, cannot be easily registered after combining the exposures. The result is motion artifacts.

The present invention solves the problem of misregistration of a combined HDR image by capturing several exposures within a single frame time. This reduces motion artifacts, by interlacing the exposure times, such that some pixels receive one exposure time while other pixels receive a different exposure time.

It will be appreciated that by overlapping exposures, as shown (for example) in FIGS. 5, 6, 7, 8 and 9, some motion artifacts are reduced. However, the overall image resolution is reduced, since only half the pixels are used for each exposure.

Figure 11:
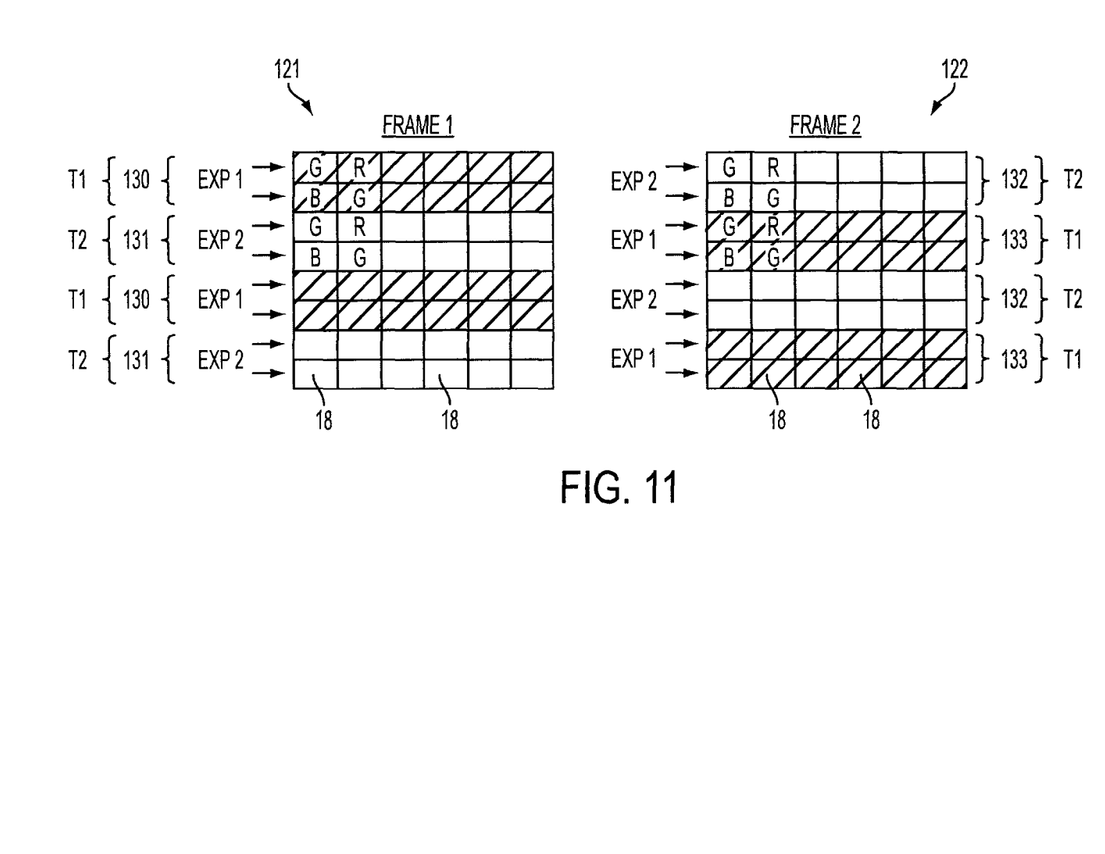
FIG. 11 is a diagram of two sequential frames, in which each frame includes two exposure periods, T1 and T2, of pairs of rows of pixels, in accordance with an embodiment of the present invention.

As now shown in FIG. 11, two sequential frames 1 and 2 (designated as 121 and 122) are taken by electronic device 10 (FIG. 1). Each frame includes a Bayer CFA overlaid on top of pixels 18, as previously described. When capturing an HDR image, row pairs 130 are integrated for a time T1 (exposure 1) and row pairs 131 are integrated for a time T2 (exposure 2).

Similarly, row pairs 132 are integrated for a time T2 (exposure 2) and row pairs 133 are integrated for a time T1 (exposure 1). Note that time T1 has the same duration when capturing frame 1 (121) or frame 2 (122). Furthermore, time T2 has the same duration when capturing frame 1 (121) or frame 2 (122).

It will be appreciated, however, that the frames have alternating interlaced exposures, such that frame 1 has odd row pairs at Exp1 and even row pairs at Exp2 and, then, frame 2 has odd row pairs at Exp2 and even row pairs at Exp1. In this manner, the present invention reduces motion artifacts and still maintains full resolution image output. The concept is to provide alternating interlaced exposure for sequential frames, such that frame 1 has odd (or even) row pairs at Exp1 and even (or odd) row pairs at Exp2 and then frame 2 has even (or odd) row pairs at Exp1 and odd (or even) row pairs at Exp2.

FIG. 11 shows an example, of interlacing exposures with a Bayer pattern. The present invention, however, may be extended to any pixel color pattern.

When frames 1 and 2 are combined, a full resolution image is available for both Exp1 and Exp2 exposures and motion of objects in the scene are captured at each frame time providing more information about the objects motion. The additional information makes it possible to correct motion artifacts during image processing.

Figure 12:
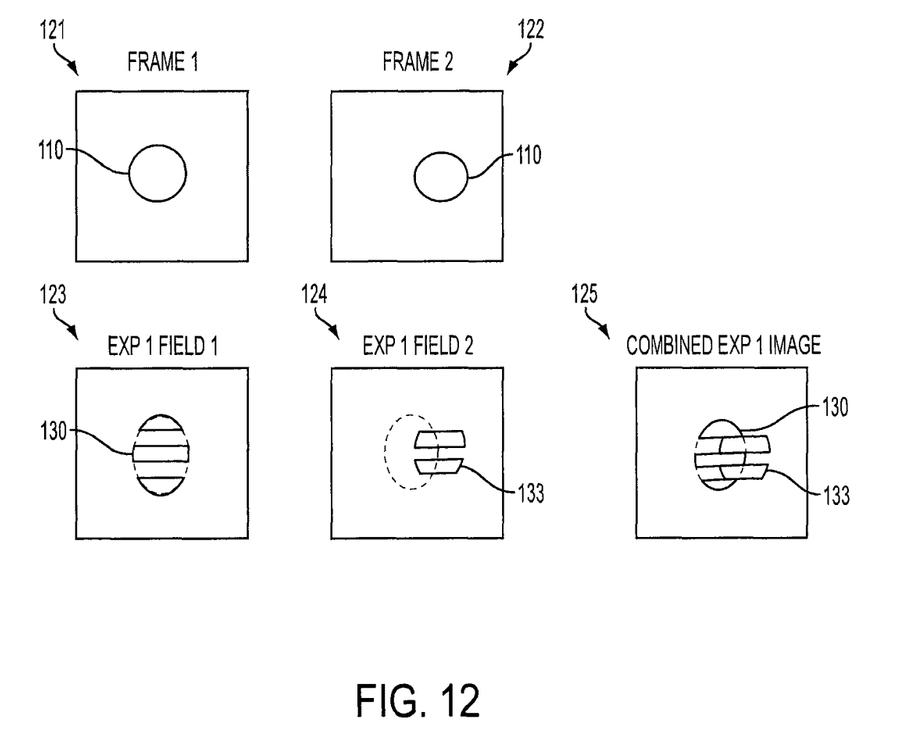
FIG. 12 is a diagram showing a combined image resulting from a T1 exposure period for frame 1 and a T1 exposure period for frame 2, in accordance with an embodiment of the present invention.

Referring next to FIG. 12, an example of how combining frames 1 and 2 (121 and 122) provides a clearly defined interlaced pattern. As shown, frames 121 and 122 include moving object 110. The digital system (FIG. 1) obtains field 1 (123) which includes only pixels integrated during exposure 1; these pixels are part of row pairs T1 (130 in FIG. 11). Similarly, field 2 (124) is obtained including only pixels integrated during exposure 1; these pixels are part of row pairs T1 (133 in FIG. 11).

Upon combining field 1 (123) and field 2 (124), a combined image 125 is formed by the digital system. The combined image includes image 130, which corresponds to the location of object 110 in frame 1; and image 133, which corresponds to the location of object 110 in frame 2. Advantageously, the combined image for Exp1 across two frames shows an interlaced motion artifact with a clearly defined interlaced pattern.

Figure 13:
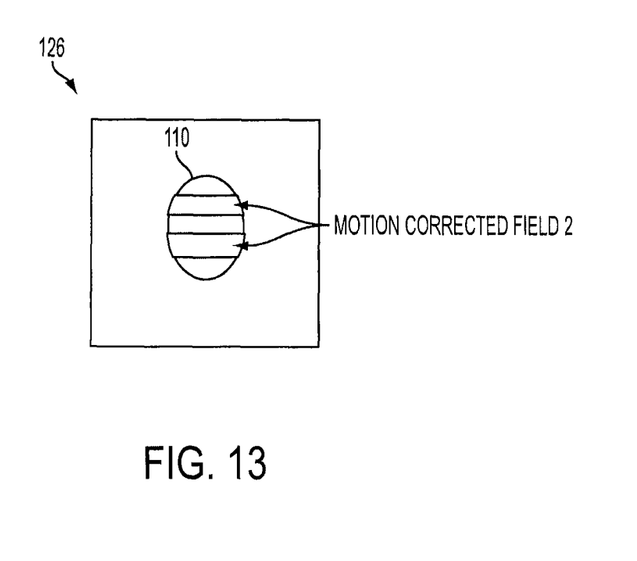
FIG. 13 is a diagram of a motion corrected image in the combined image shown in FIG. 12, in accordance with an embodiment of the present invention.

Referring lastly to FIG. 13, after motion correction, field 2 of exposure 1 (shown as 133 in FIG. 12) may be properly aligned with field 1 of exposure 1 (shown as 130 in FIG. 12). In this manner, the present invention provides a clearly identifiable signature for motion correction. This is a significant advantage over traditional multi-frame capture HDR, where object motion recognition and correction is challenging.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An imager comprising:
an array of pixels arranged in rows;
a control circuit for sequentially capturing first and second image frames from the array of pixels; and
the control circuit for sequentially capturing first and second pairs of adjacent rows of pixels during first and second exposure times, respectively, when capturing the first image frame, and
the control circuit for sequentially capturing first and second pairs of adjacent rows of pixels during second and first exposure times, respectively, when capturing the second image frame,
wherein the first exposure times during the first and second frames are of similar duration, and
the second exposure times during the first and second frames are of similar duration.

2. The imager of claim 1 wherein the first and second pairs of adjacent rows are interleaved together in the array of pixels, and the first and second pairs of adjacent rows comprise interlaced images of the first frame and interlaced images of the second frame.

3. The imager of claim 1 wherein the first and second exposure times at least partially overlap in time.

4. The imager of claim 3 wherein the first exposure time is of greater duration than the second exposure time.

5. The imager of claim 3 wherein the second exposure time occurs during the first exposure time, and the second exposure time is of a lesser duration than the first exposure time.

6. The imager of claim 1 wherein the control circuit is configured to interleave the captured first and second pairs of adjacent rows of pixels, respectively, during the first exposure times of the first and second image frames, and the control circuit is configured to detect motion of an object between the first and second image frames, and correct for the motion.

7. The imager of claim 6 wherein the control circuit is configured to motion compensate the second image frame with respect to the first image frame.

8. The imager of claim 1 wherein the control circuit is configured to interleave the captured first and second pairs of adjacent rows of pixels, respectively, during the second exposure times of the first and second image frames, and the control circuit is configured to detect motion of an object between the first and second image frames, and correct for the motion.

9. The imager of claim 8 wherein the control circuit is configured to motion compensate the second image frame with respect to the first image frame.

10. The imager of claim 1 wherein the first and second image frames comprise a portion of video images, and the first and second exposure times comprise interlaced intensities of sequential row pairs of pixels captured during each video frame.

11. A method of using an image processing circuit to form a high dynamic range (HDR) image from an image sensor, the method comprising the steps of:
capturing first and second interlaced images of a first image frame, wherein the first and second interlaced images are captured using different respective exposure times;
capturing first and second interlaced images of a second image frame, wherein the first and second interlaced images are captured using different respective exposure times;
wherein the first and second interlaced images of the first image frame are captured using a sequence of first, then second exposure times, respectively, and
the first and second interlaced images of the second image frame are captured using a reverse sequence of second, then first exposure times, respectively.

12. The method of claim 11 wherein the first and second exposure times at least partially overlap in time.

13. The method of claim 11 wherein the second exposure time occurs during the first exposure time, and the second exposure time is of a lesser duration than the first exposure time.

14. The method of claim 11 including the steps of:
interlacing the first image captured during the first exposure time with the second image captured during the first exposure time; and correcting the interlaced images using motion compensation, if a moving object is detected in the first and second image frames.

15. The method of claim 11 wherein the first and second image frames comprise a portion of video images, and the first and second exposure times comprise interlaced intensities of sequential row pairs of pixels captured during each video frame.

16. A controller for processing an image from an image sensor, the controller executing the following steps:

capturing first and second interlaced images of a first image frame, wherein the first and second interlaced images are captured using different respective exposure times;

capturing first and second interlaced images of a second image frame, wherein the first and second interlaced images are captured using different respective exposure times;

wherein the first and second interlaced images of the first image frame are captured using a sequence of first, then second exposure times, respectively, and the first and second interlaced images of the second image frame are captured using a reverse sequence of second, then first exposure times, respectively.

17. The method of claim 16 wherein the first and second exposure times at least partially overlap in time.

18. The method of claim 16 wherein the second exposure time occurs during the first exposure time, and the second exposure time is of a lesser duration than the first exposure time.

19. The method of claim 16 including the steps of:

interlacing the first image captured during the first exposure time with the second image captured during the first exposure time; and correcting the interlaced images using motion compensation, if a moving object is detected in the first and second image frames.

20. The method of claim 16 wherein the first and second image frames comprise a portion of video images, and the first and second exposure times comprise interlaced intensities of sequential row pairs of pixels captured during each video frame.

* * * * *